US012754058B2

United States Patent

(12) United States Patent
Antonakis

(10) Patent No.: US 12,754,058 B2
(45) Date of Patent: Oct. 6, 2026

(54) FLAME PRODUCING ASSEMBLY

(71) Applicant: BIC Violex Single Member S.A., Anoixi (GR)

(72) Inventor: Ion-Ioannis Antonakis, Anoixi (GR)

(73) Assignee: BIC Violex Single Member S.A., Anoixi (GR)

( * ) Notice: Subject to any disclaimer, the term of this patent is extended or adjusted under 35 U.S.C. 154(b) by 306 days.

(21) Appl. No.: 18/563,014

(22) PCT Filed: May 30, 2022

(86) PCT No.: PCT/EP2022/064560
§ 371 (c)(1),
(2) Date: Nov. 21, 2023

(87) PCT Pub. No.: WO2022/268437
PCT Pub. Date: Dec. 29, 2022

(65) Prior Publication Data

US 2024/0263989 A1 Aug. 8, 2024

(30) Foreign Application Priority Data

Jun. 23, 2021 (EP) .................................... 21181197

(51) Int. Cl.
*G01F 23/62* (2006.01)
*F23Q 2/16* (2006.01)
*F23Q 2/42* (2006.01)

(52) U.S. Cl.
CPC ............... *G01F 23/62* (2013.01); *F23Q 2/16* (2013.01); *F23Q 2/42* (2013.01)

(58) Field of Classification Search
CPC ............... G01F 23/62; F23Q 2/16; F23Q 2/42
(Continued)

(56) References Cited

U.S. PATENT DOCUMENTS 4,512,190 A 4/1985 Sledmere
5,645,336 A 7/1997 Brown et al.
(Continued)

FOREIGN PATENT DOCUMENTS

CN 1206432 A 1/1999
CN 202598593 U 12/2012
(Continued)

OTHER PUBLICATIONS

International Search Report and Written Opinion, Application No. PCT/EP2022/064560, mailed Sep. 15, 2022. 15 pages.

*Primary Examiner* — Vivek K Shirsat
(74) *Attorney, Agent, or Firm* — Bookoff McAndrews, PLLC

(57) ABSTRACT

A flame producing assembly comprising a sealed body comprising a proximal and a distal end aligned on a longitudinal axis, wherein the sealed body comprises a void, a fuel supply comprising liquid fuel accommodated in the void within the sealed body, a fuel release assembly enabling a controllable release of the fuel supply in gaseous form from the sealed body, a fuel indicator configured to indicate a remaining amount of liquid fuel contained in the sealed body to a user of the flame producing assembly, wherein at least a portion of the fuel indicator is capable of changing appearance when in proximity to a magnetic field, and a level tracking member comprising at least one magnet supported by a buoyant member.

20 Claims, 8 Drawing Sheets

(58) Field of Classification Search
USPC ................. 431/273–277, 130, 13; 73/DIG. 5
See application file for complete search history.

(56) References Cited

U.S. PATENT DOCUMENTS

| | | | | |
|---|---|---|---|---|
| 6,502,461 | B2 | 1/2003 | Keller | |
| 7,987,710 | B2 | 8/2011 | Stone | |
| 10,309,822 | B2 | 6/2019 | Wu et al. | |
| 2003/0180676 | A1* | 9/2003 | Xie | F23Q 2/42 431/142 |
| 2010/0276326 | A1 | 11/2010 | Stone | |
| 2015/0253179 | A1* | 9/2015 | Carlson | G01F 23/0046 116/204 |

FOREIGN PATENT DOCUMENTS

| | | | |
|---|---|---|---|
| CN | 206056733 | U | 3/2017 |
| DE | 102018007147 | A1 | 4/2019 |
| IT | 1236759 | B | 4/1993 |
| JP | S5161073 | U | 5/1976 |
| JP | S54178551 | U | 12/1979 |
| JP | S5746124 | A | 3/1982 |
| JP | S58182028 | A | 10/1983 |
| JP | 2000055361 | A | 2/2000 |
| JP | 4291781 | B2 | 7/2009 |
| RU | 154722 | U1 | 9/2015 |
| WO | 0159411 | A1 | 8/2001 |

* cited by examiner

FLAME PRODUCING ASSEMBLY

CROSS-REFERENCE TO RELATED APPLICATIONS

This application is a National Stage Application under 35 U.S.C. § 371 of PCT/EP2022/064560, filed on May 30, 2022, now published as WO 2022/268437 A1 which claims priority from European Patent Application No. 21181197, filed on Jun. 23, 2021, the contents being incorporated herein by reference.

TECHNICAL FIELD

The embodiments described in the following disclosure relate to flame producing assemblies and methods of using a flame producing assembly.

BACKGROUND

Flame producing assemblies such as a conventional cigarette lighters comprise a fuel source of pressurized and liquidized butane. Plastic materials used to provide a safe enclosure for the liquidized butane are often opaque. This means that the user of a conventional cigarette lighter cannot observe the amount of fuel remaining inside a conventional cigarette lighter by visual inspection of the cigarette lighter. This leads to conventional cigarette lighters being disposed of before the liquid fuel supply has been fully exhausted.

The performance of flame producing devices such as cigarette lighters can, therefore, be further improved.

SUMMARY

According to a first aspect, there is provided a flame producing assembly. The flame producing assembly comprises a sealed body comprising a proximal and a distal end aligned on a longitudinal axis, a fuel supply comprising liquid fuel isolated within the sealed body, a fuel release member enabling a controllable release of the fuel supply in gaseous form from the sealed body, and a fuel indicator configured to indicate a remaining amount of liquid fuel contained in the sealed body to a user of the flame producing assembly. At least a portion of the fuel indicator is capable of changing appearance when in proximity to a magnetic field. The flame producing assembly further comprises a level tracking member comprising at least one magnet supported by a buoyant member. The at least one magnet is configured to apply a magnetic field to the fuel indicator, thus causing the fuel indicator to indicate an amount of liquid fuel remaining in the sealed body to a user.

According to this aspect, accurate visualisation of the fuel consumed by a flame producing assembly, or the fuel remaining, is possible even if the flame producing assembly is opaque or visibility of the fuel inside the flame producing assembly is not possible. Furthermore, it may be difficult for users to view the amount of fuel remaining even with translucent bodies. Use of a fuel level indicator as discussed herein can improve visibility in a flame producing assembly having translucent and opaque flame producing assembly bodies. Furthermore, flame producing assemblies (such as cigarette lighters) substantially as described herein are not prematurely disposed of by users, thus reducing plastic waste over time. Furthermore, the lighters that are disposed of can be guaranteed to have exhausted their liquid fuel supply, thus improving the effect on the environment. Using an appropriate scale, the communication of an approximate number of flame generating actuations of the lighter left can be communicated to a user. As a passive measure of the remaining fuel, the user does not need to activate the fuel level indication system, and no external electronics are required, because the magnet and fuel indicator capable of changing colour in the influence of a magnetic field is always active without requiring electricity.

According to a second aspect, there is provided a method for using a flame producing assembly, comprising:

- aligning a flame producing assembly comprising a sealed body having a proximal and a distal end aligned on a longitudinal axis such that the longitudinal axis of the sealed body is substantially vertical, and such that a fuel indicator of the flame producing assembly is configured to indicate a remaining amount of liquid fuel contained in the sealed body to a user of the flame producing assembly, wherein at least a portion of the fuel indicator is capable of changing appearance when in proximity to a magnetic field, wherein the sealed body contains a liquid fuel supply; and
- monitoring a level tracking member of the flame producing assembly comprising at least one magnet supported by a buoyant member and configured to apply a magnetic field to the fuel indicator, thereby causing the fuel indicator to indicate an amount of liquid fuel remaining in the sealed body to a user, thus causing the fuel indicator to change appearance such that the remaining level of liquid fuel is reported to the user.

According to the present disclosure, the term "flame producing assembly" may refer to a cigarette lighter, cigar lighter, domestic gas ring lighter, butane gas cylinder (for example, as used in a camping stove or Barbeque), a gas-powered soldering iron, or a utility blowtorch for paint stripping, as examples.

According to the present disclosure, the term "proximal" refers to the end of a substantially longitudinal body such as a flame producing assembly that, in use, is closer to an element being lit by the flame producing assembly, such as a cigarette. The term "distal" refers to the end of a substantially longitudinal body such as a flame producing assembly that, in use, is further from element being lit by the flame producing assembly than the "proximal" portion.

BRIEF DESCRIPTION OF THE DRAWINGS

Other characteristics will be apparent from the accompanying drawings, which form a part of this disclosure. The drawings are intended to further explain the present disclosure and to enable a person skilled in the art to practice it. However, the drawings are intended as non-limiting examples. Common reference numerals on different figures indicate like or similar features.

DETAILED DESCRIPTION

Figure 1:
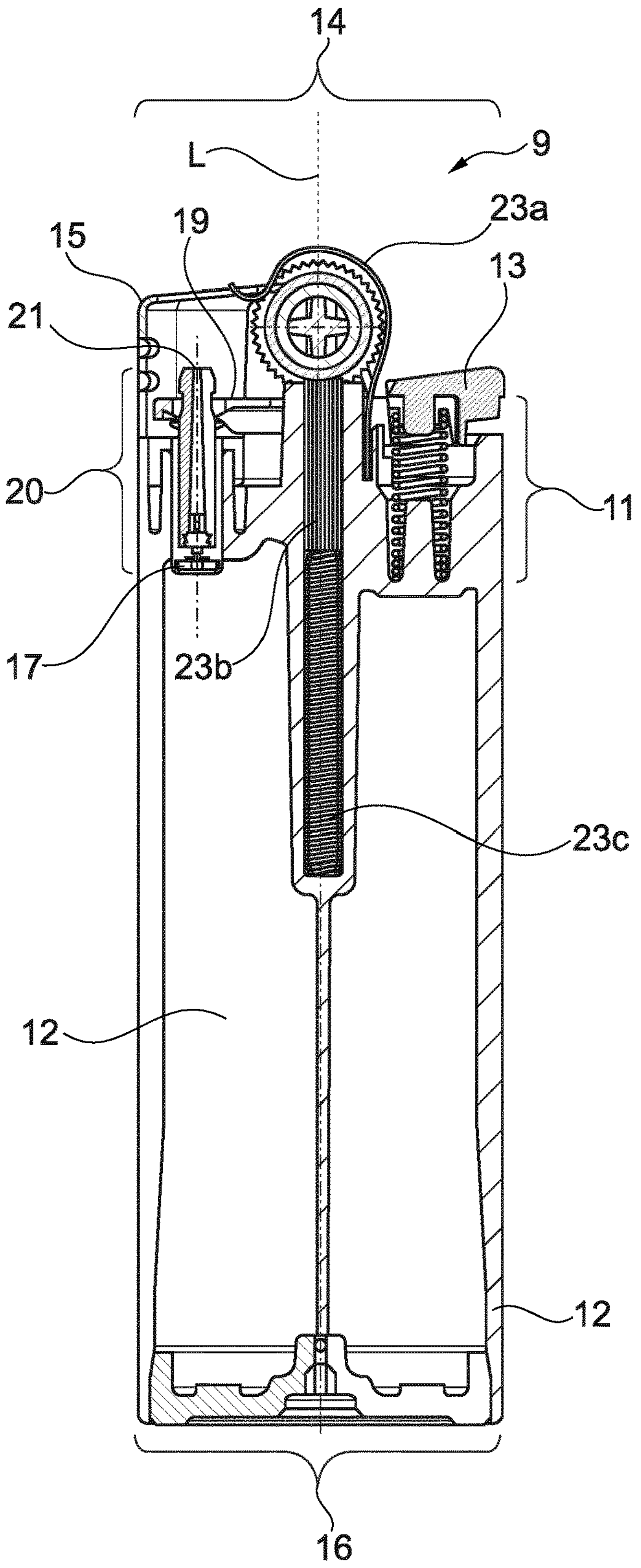
Prior art Fig. 1
FIG. 1 illustrates a standard cigarette lighter.

FIG. 1 illustrates a standard cigarette lighter.

Conventional cigarette lighters (flame producing assemblies) are filled with pressurised butane gas in liquid form. The basic aspects of a standard cigarette lighter 9 are illustrated in FIG. 1. The standard cigarette lighter 9 comprises a sealed body 12 having a proximal end 14 and a distal end 16. The standard cigarette lighter 9 is disposed between the proximal end 14 and the distal end 16 along a longitudinal axis L. At the proximal end 14 of the standard cigarette lighter 9, an ignition control portion 11 is collocated with, and operably connected to, a fuel release assembly 20. A wind guard 15 is usually provided in proximity to the fuel release assembly 20 to prevent the rapid extinguishment of the flame by strong wind incident on the lighter 9. A sparking assembly 23 comprises a striking wheel 23*a* held in contact against a sparking member 23*b* by a confined spring 23*c*. The sparking member 23*b* may, for example, be a portion of flint.

The fuel release assembly 20 may comprise, for example, a sealed body outlet 17 and a nozzle member 21. The nozzle member 21 is attached to a first end of actuation lever 19. The nozzle member 21 is arranged to move substantially in parallel to the longitudinal axis L of the lighter 9 upon movement of the end of the actuation lever 19 that holds the nozzle member 21 towards the proximal end 14. As the nozzle member 21 moves away from the sealed body outlet 17, a valve seat (for example) is exposed, enabling a pressurised gas within the void of the sealed body 12 to exit the sealed body 12 via the sealed body outlet 17 and through the nozzle member 21.

The ignition control portion 11 comprises a spring-biased ignition button 13 actuatable by a user of the lighter 9. The ignition button 13 is operably coupled to a second end of the actuation lever 19. When the ignition button 13 is pressed down by a user (along the direction of the longitudinal axis L from the proximal end 14 to the distal end 16, the second end of the actuation lever 19 is pressed downwards, and thus by the action of a fulcrum (not shown), the first end of the actuation lever 19 moves substantially along the longitudinal direction in the direction from the distal end 16 to the proximal end 14. A protruding lip of the nozzle member 21 captures a portion of the first end of the actuation lever 19 during this motion, typically causing the nozzle member to be translated substantially along the longitudinal direction in the direction from the distal end 16 to the proximal end 14 with the first end of the actuation lever 19. This uncovers the outlet 17 of the sealed body 12, enabling gaseous fuel (for example, from compressed isobutane) to escape to the portion of the nozzle member 21 enclosed by wind guard 15.

Contemporaneously with the action described in the previous paragraph, during conventional operation of the standard cigarette lighter 9, a user manipulates the striking wheel 23*a* such that a spark is generated in proximity to the nozzle member 21 enclosed by wind guard 15. The presence of a gaseous fuel in proximity to the nozzle member 21 implies that the spark will light the gaseous fuel to produce a flame suitable for lighting a cigarette, for example. The flame remains until the user removes the force from the ignition button 13, or until the fuel supply is exhausted.

When a user removes the force from the ignition button 13 of the ignition control portion 11, the previously described action is reversed by a resilient member (not shown), for example a biasing spring of the ignition control portion, thus causing the sealed body outlet 17 to be closed.

In view of the foregoing discussion, typically the body of a standard cigarette lighter 9 is often compact, durable, and unbreakable in order to maintain the required gas liquification pressures safely. Therefore, in high quality lighters, special grade opaque plastic materials are used that possess the required mechanical properties. The grade of plastic used for the body of the lighter being non-transparent makes it impossible for a user to see, or to estimate, the level of the liquid fuel quantity remaining inside the plastic container. Therefore, a regular lighter user is not able to verify, easily and accurately, if the lighter contains enough fuel to last for a desired period of time.

As discussed herein, a lighter user is able, by means of a special indicator, to estimate the approximate amount of fuel or number of flames left by the use of a fuel level indicator.

Figure 2:
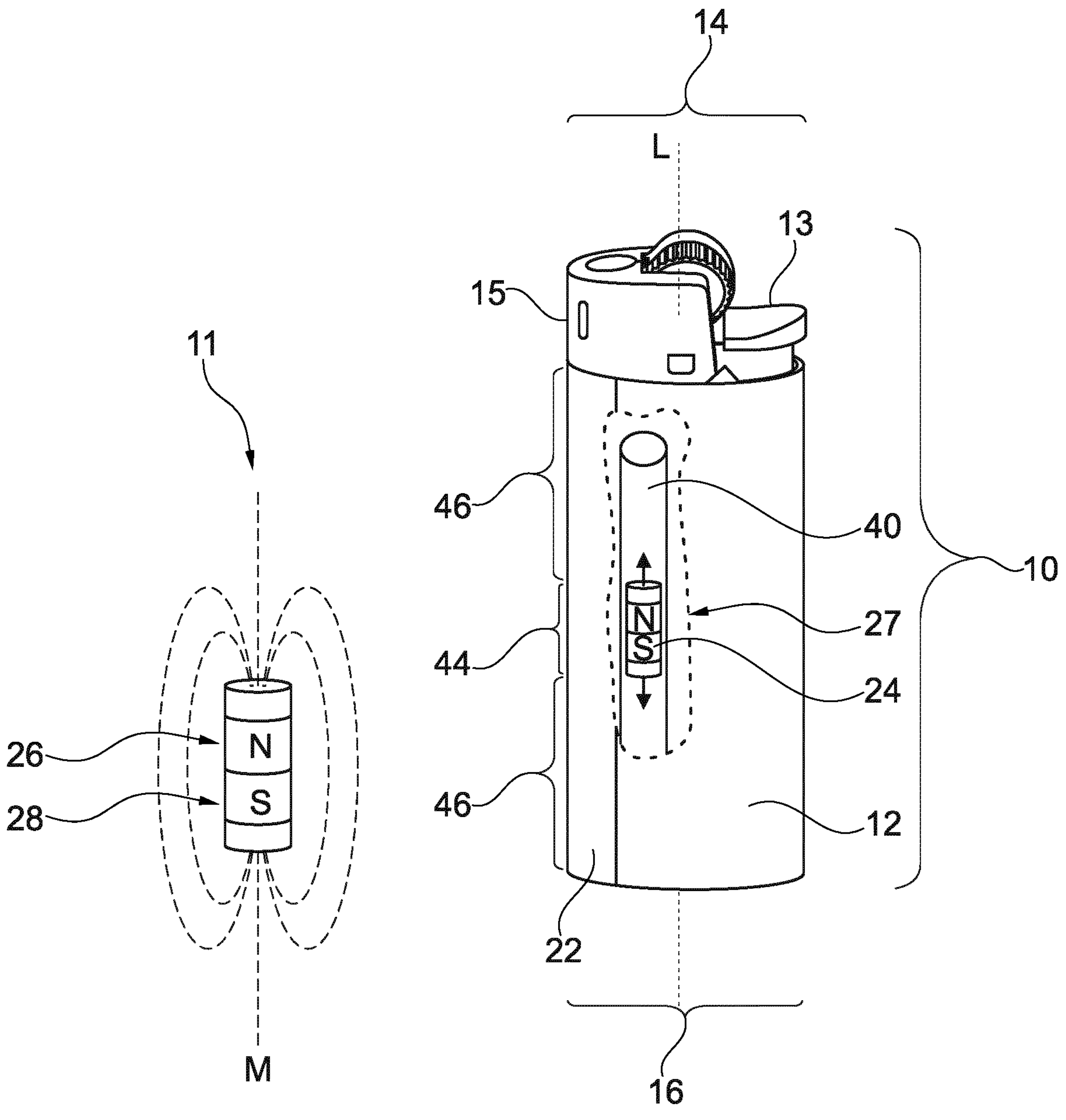
FIG. 2 illustrates a general external view comprising a partial internal cutaway view of a flame producing device with a magnetic indicator according to aspects discussed herein.

FIG. 2 illustrates a general external view comprising a partial internal cutaway view of a flame producing assembly 10 with a magnetic indicator according to aspects discussed herein. Reference numerals denoting similar elements of a flame producing assembly 10 as introduced in FIG. 1 are repeated. This is for the purpose of example only. A skilled person will understand that a level tracking member comprising a magnet, and a fuel indicator capable of indicating a remaining amount of fuel when in proximity to a magnetic field, as described herein, may be applied to a wide range of flame producing articles, without limitation to the example design illustrated in the Figures.

In general, the present application concerns a flame producing assembly 10 having a sealed body 12 containing pressurised liquid fuel. The flame producing assembly 10 illustrated in FIG. 2 demonstrates the internal position of a level tracking member 24 in relation to the position of a fuel indicator using the sealed body cutaway view 27. In FIG. 2, the void of the sealed body 12 is approximately half filled with liquid pressurised fuel. The level tracking member 24 moves in a longitudinal direction L according to the level of the liquid pressurised fuel in the sealed body 12. The level tracking member 24 comprises a magnet and also comprises a buoyant member enabling the level tracking member 24 to be buoyant on, or close to, the surface of the remaining liquid pressurised fuel. The level tracking member 24 moves along a path defined by the shape and/or path of confinement member 40, which in this example is illustrated as a cylinder having at least one fluid connection to the sealed body 12. As shown in an inset of FIG. 2, an example of a buoyant level tracking member 24 is a magnet 26 having a magnetic axis M fixed to one or more buoyant members 28.

According to embodiments, the fuel indicator 22 is configured to display feedback to the user of the approximate amount of fuel remaining in the sealed body via one or more text or indicator labels on a visible surface of the flame producing assembly 10, and/or via a change in colour of the fuel indicator 22.

According to embodiments, the fuel indicator 22 indicates the current amount or level of fuel remaining relative to the proximal 14 and distal ends 16 of the sealed body 12 to a user.

A visible portion of the sealed body 12 comprises a fuel indicator 22, for example, a magnetic indication strip or magnetochromic liquid containing member. The fuel indicator 22 is capable of changing appearance when in proximity to a magnetic field. A magnetic field of the magnet 26 therefore changes the appearance of the visible portion of the sealed body 12 to provide a region of maximum appearance change 44 of the fuel indicator 22. A user may place the flame producing assembly 10 such that its longitudinal axis L is substantially parallel to a vertical direction, and in this case, the region of maximum appearance change 44 of the fuel indicator 22 may be read by a user as corresponding to a remaining amount of pressurised liquid fuel inside the sealed body 12, therefore enabling the user to estimate the remaining amount of fuel inside the sealed body 12. In examples, appearance change implies a change in colour of at least a portion of the fuel indicator. Of course, more advanced patterning of the substance of the fuel indicator 22 may be provided to enable a range of lines, textual display features, icons, motifs, and the like based on the remaining amount of pressurised liquid fuel in the sealed chamber 12.

In other words, the flame producing assembly 10 provides a passive system for estimating the approximate amount of fuel or number of flames left. In examples, at least one magnet 26 passively follows the level of pressurised liquid fuel in the flame producing assembly 10. A passive user indication system that communicates the amount of fuel, and/or number of flames remaining, to the user via at least one magnetic indication member located on the outer surface of the flame producing assembly 10 is provided.

In view of this general operational principle, a specific example of a flame producing assembly will now be discussed, although a skilled person will appreciate that many variations exist.

According to a first aspect, there is provided a flame producing assembly 10. The flame producing assembly comprises a sealed body 12 comprising a proximal 14 and a distal 16 end aligned on a longitudinal axis L, wherein the sealed body comprises a void. The flame producing assembly 10 comprises a fuel supply 18 (see FIG. 4) comprising liquid fuel accommodated in the void within the sealed body, and a fuel release assembly 20 enabling a controllable release of the fuel supply in gaseous form from the sealed body. The flame producing assembly 10 further comprises a fuel indicator 22 configured to indicate a remaining amount of liquid fuel contained in the sealed body to a user of the flame producing assembly, wherein at least a portion of the fuel indicator is capable of changing appearance when in proximity to a magnetic field, and a level tracking member 24 comprising at least one magnet 26 supported by a buoyant member 28. The at least one magnet 26 is configured to apply a magnetic field to the fuel indicator 22, thus causing the fuel indicator 22 to indicate an amount of liquid fuel remaining in the sealed body 12 to a user. In embodiments, the level tracking member 24 comprises one magnet. In embodiments, the level tracking member 24 comprises a plurality of magnets.

Figure 3:
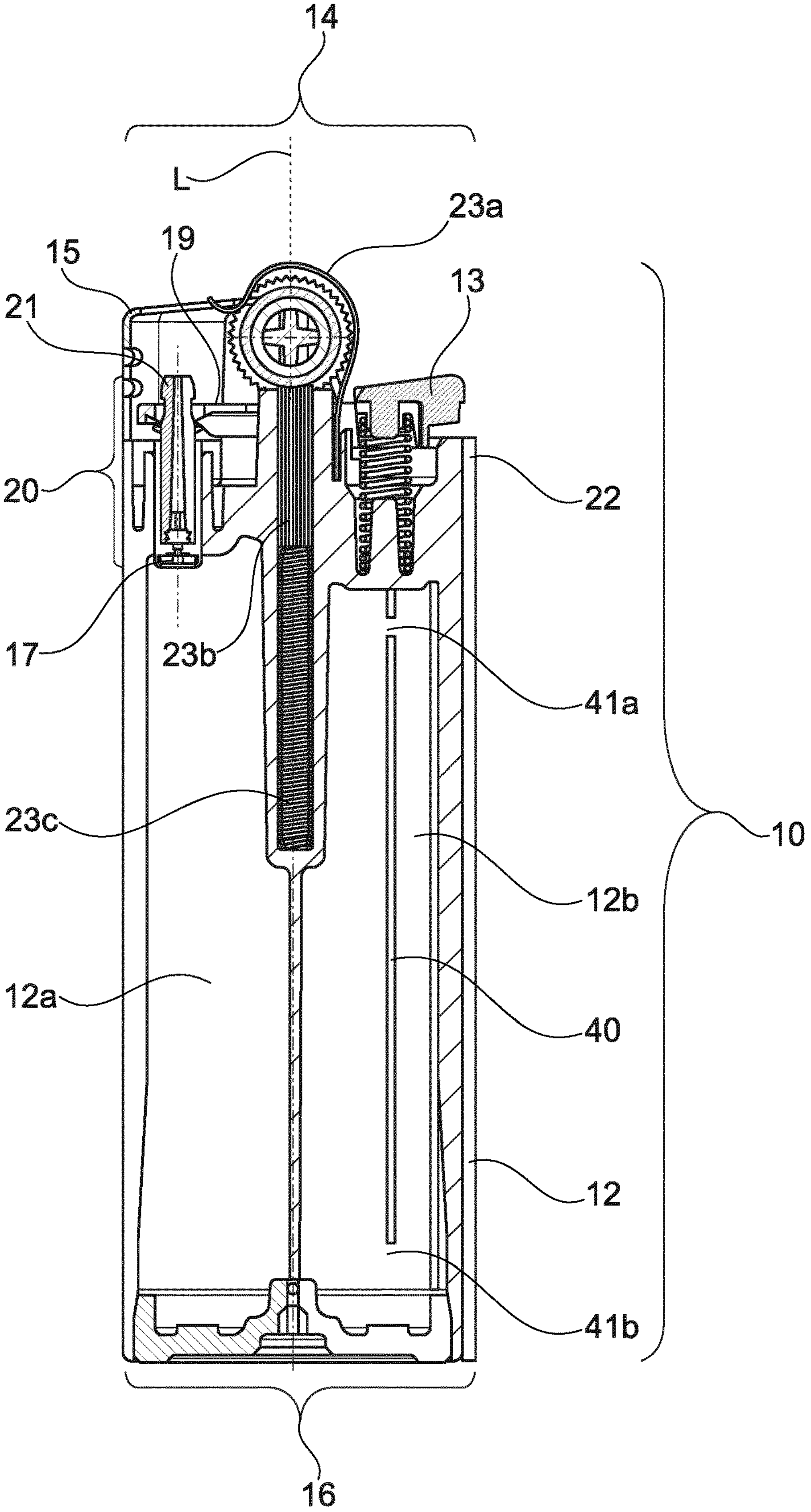
FIG. 3 schematically illustrates a longitudinal section of a conventional flame producing device for illustrative purposes.

FIG. 3 schematically illustrates a longitudinal section of a flame producing assembly 10 lacking the level tracking member 24 for illustrative purposes.

The flame producing assembly 10 resembles the cigarette lighter 9, and like reference numerals as compared to those of FIG. 1 denote like or similar parts. The flame producing assembly 10 further comprises a fuel indicator 22 disposed along a portion of the outer (visible) surface of the sealed body 12. In examples, the fuel indicator 22 extends along the entirety of the surface of the sealed body 12, as illustrated in FIG. 3. In examples, the fuel indicator extends along a portion of the surface of the sealed body. The fuel indicator 22 is capable of changing appearance when in proximity to a magnetic field. The level tracking member 24 may comprise at least one magnet 26 supported by a buoyant member 28 (not illustrated in FIG. 3). In embodiments, the level tracking member 24 is confined by a confinement member 40 provided in this example as a linear separator comprising first 41*a* and second 41*b* liquid flow apertures in fluid communication with the main void of the sealed body 12. Therefore, the confinement member 40 provides a track along which the level tracking member 24 may freely float whilst in proximity to the fuel indicator 22. The magnetic field created by at least one magnet 26 may thus be exposed to the fuel indicator 22 along the longitudinal direction L in a controlled manner, as the liquid fuel depletes from the sealed body 12.

Figure 4:
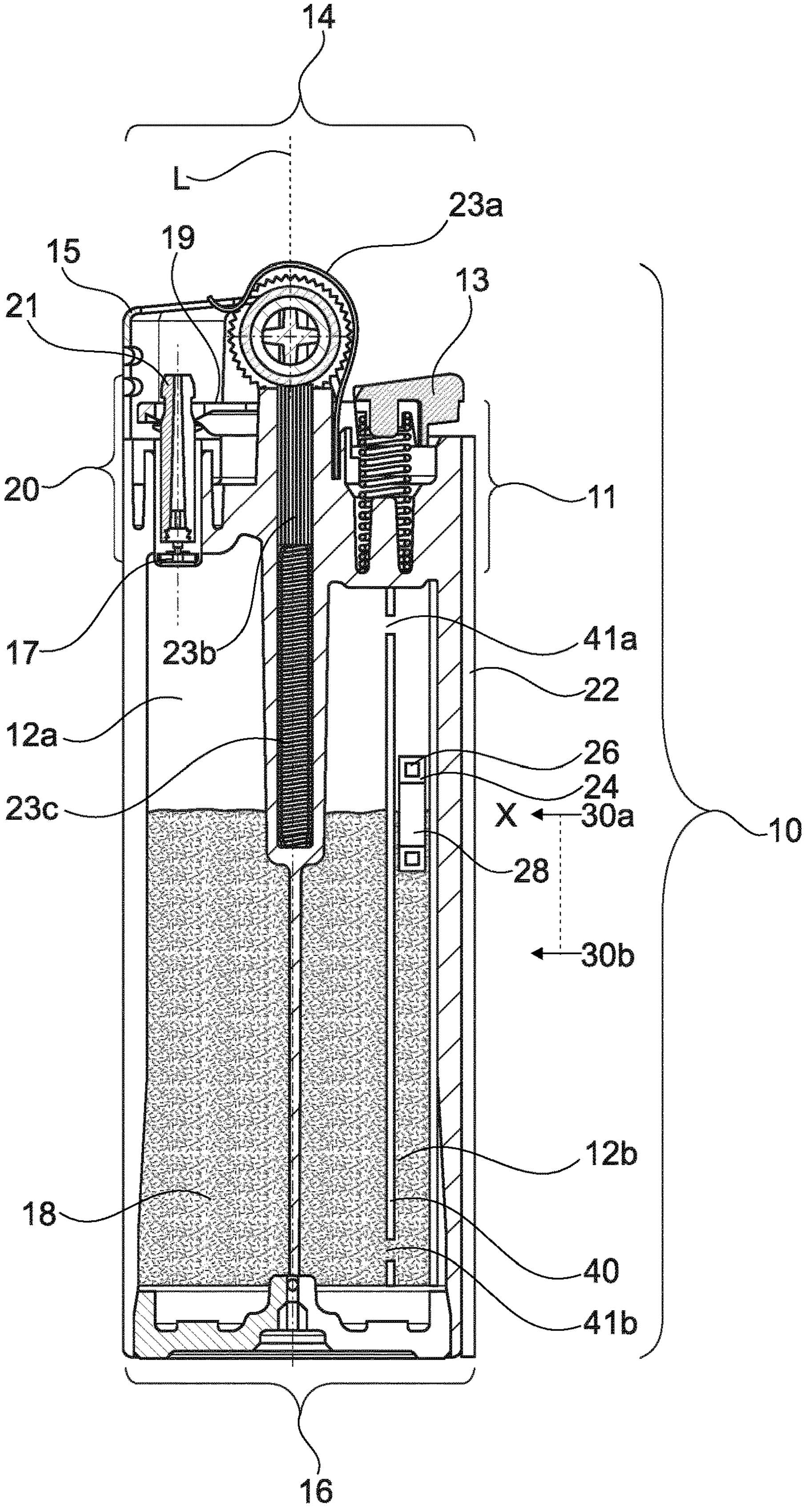
FIG. 4 further schematically illustrates the longitudinal section of the flame producing device according to FIG. 3.

FIG. 4 further schematically illustrates the longitudinal section of the flame producing device according to FIG. 3.

The void of the sealed body 12 is half-filled with pressurised liquid fuel in the illustration. A level tracking member 24 comprising a buoyant member 28 and a magnet 26 moves with the level of the pressurised liquid fuel in the sealed body 12 because the interior of confinement member 40 housing the level tracking member 24 is in fluid communication with the main volume of the sealed body 12 via at least liquid flow apertures 41*b* and 41*a*, such that the fuel indicator 22 changes appearance at location X. This corresponds to a point of maximum change in magnetic flux incident on the surface of the fuel indicator 22.

According to embodiments, the fuel indicator 22 comprises at least one sealed body comprising a liquid magnetochromic ink. The fuel indicator 22 may comprise a liquid magnetochromic ink. Therefore, fuel indicator 22 may be a pouch, cavity or thin body disposed proximate to the external surface of the sealed body 12 to enable changes in the liquid magnetochromic ink to be perceived by the user.

According to embodiments, the void within the sealed body 12 is divided such that the sealed body comprises a first chamber 12*a* and a second chamber 12*b*, wherein the second chamber is aligned in parallel with the longitudinal axis, wherein the second chamber is in fluidic communication with the first chamber, and wherein the level tracking member 24 is confined to the second chamber and a boundary of the second chamber is proximate to the fuel indicator 22.

For example, in FIG. 4 the confinement member 40 terminates with a first liquid flow aperture 41*a* towards the proximal end 14 of the flame producing assembly 10, and a second liquid flow aperture 41*b* towards the distal end 16 of the flame producing assembly 10. In this case, the confinement member 40 is provided as a divider inside the sealed body 12. The divider may be integrally formed with the same material as the remainder of the sealed body 12, to form a tube-like second chamber 12*b* (as also illustrated in FIG. 3) for the level tracking member 24 to move within.

According to embodiments, the interior of the sealed body 12 comprises at least one confinement member 40 to confine the path of the level tracking member within the sealed body, for example in a path that is aligned in parallel to the longitudinal axis of the flame producing assembly 10.

In embodiments (not illustrated), the divider inside the sealed body 12 forming the confinement member 40 does not need to form a tube inside the sealed body 12. For example, a rear inner surface of the sealed body 12 may be provided with a first elongate linear protrusion. A front inner surface of the sealed body 12 may be provided with a second elongate linear protrusion facing the first elongate linear protrusion, but not sealably abutting the first elongate linear protrusion so as to form a seal. In this case, a linear gap running along substantially the entire longitudinal length of the flame producing assembly 10 forms the fluidic connection to the first chamber 12*a* of the sealed body 12. The first and second elongate linear protrusions form a guide that the level tracking member 24 may move along according to the remaining amount of liquid fuel in the first chamber 12*a* of the sealed body 12.

In embodiments (not illustrated), the confinement member 40 may be provided as a plastic or metal guide wire. In operation, the level tracking member 24 moves in a predefined path according to the placement of the plastic or metal guide wire along with the level of remaining fuel in the sealed body 12.

In embodiments (not illustrated), the confinement member 40 may be provided by one or more blocking members or pegs positioned in the sealed body 12 between a front and rear face of the flame producing assembly 10. In operation, the level tracking member 24 moves in a predefined path bounded by the one or more detents or pegs according to the level of remaining fuel in the sealed body 12.

According to embodiments, an internal surface of the second chamber 12*b* comprises a low friction coating 42*a*, 42*b* configured to facilitate the movement of the level tracking member 24 in a direction substantially parallel to the longitudinal axis L. A skilled person will appreciate that a plastic forming the body of the sealed member 12 such as Delrin™ has a relatively low coefficient of friction. In embodiments, at least a portion of an internal surface of the second chamber 12*b* may be coated with a low-friction coating such as Teflon™ to facilitate the movement of the level tracking member 24, and/or to prevent the level tracking member 24 from becoming stuck against the side of the confinement member 40. In embodiments, the confinement member 40 is a tube having a square, rectangular, or circular cross-section.

In embodiments, the confinement member 40 is disposed so that the level tracking member 24 moves in a substantially longitudinal direction proximate to the wall of the sealed body 12. This maximises the magnetic field incident on the magnetically active fuel indicator.

According to embodiments, the at least one magnet 26 comprises a rare-earth material, alnico, or ferrite. The at least one magnet 26 is configured to produce a constant magnetic field. The at least one magnet 26 is a permanent magnet. The dimensions of the at least one magnet are designed in cooperation with the buoyant member 28 of the level tracking member 24, and may have a specific shape and type depending on the dimensions and location of the second chamber 12*b* and/or confinement member 40 within the flame producing assembly.

In embodiments, at least one magnet 26 comprises a magnetic axis M (north-south axis) aligned substantially in parallel to the longitudinal axis L of the flame producing assembly 10. In embodiments, at least one magnet 26 comprises a magnetic axis M (north-south axis) aligned substantially perpendicular to the longitudinal axis L of the flame producing assembly 10.

The shape of the at least one magnet 26 may be, for example, spherical, cylindrical, tubular, cubic, or conical. Where more than one magnet 26 is provided, each magnet may have a different shape.

The mass of the at least one magnet 26 may be, for example, in the range 0.5 to 10 grams. For example, neodymium (NdFeB) has a density of 7 grams per cubic centimetre. In examples, the at least one magnet is an N40 magnet. In examples, an N40 neodymium magnet has a remanence (Br) of up to 1,250 mT.

In examples, the at least one magnet 26 has a remanence (Br) of between 900 and 2,000 mT. In examples, the at least one magnet 26 has a remanence (Br) of between 1,100 and 1,500 mT.

In examples, the at least one magnet 26 may be coated with a coating, such as Ni—Cu—Ni (Nickel-Copper-Nickel), or PTFE ("Teflon", TM). In particular, a Teflon coating may improve the smoothness of the motion of the at least one magnet 26 as it moves within the second chamber 12*b* of the sealed body 12.

According to embodiments, the liquid fuel is selected from: methane, acetylene, propane, propylene, hydrogen, or isobutane, or combinations thereof.

According to embodiments, the flame producing assembly 10 is a lighter, more specifically a cigarette lighter or a utility lighter.

According to embodiments, the level tracking member 24 is configured to move parallel to the longitudinal axis L of the sealed body 12 when the longitudinal axis L is aligned vertically, as illustrated in FIGS. 3 and 4, for example.

According to embodiments, the effective density of the level tracking member is less than the density of the liquid fuel comprised in the sealed body. Effective density is, for example, the average density of a member comprising a number of materials of different density averaged over unit space.

According to embodiments, the buoyant member 28 is a buoyant capsule or a porous raft configured to support the at least one magnet.

According to embodiments, the buoyant member 28 is configured to translate the at least one magnet 26 from a first position 30*a* to a second position 30*b* relative to the longitudinal axis as the amount of the liquid fuel in the sealed body 12 decreases.

According to embodiments, the level tracking member 24 is configured to float freely within the sealed body 12. A major axis of the buoyant member 28 is, for example, between 95% and 50% in length compared to a greatest internal dimension of the sealed body 12 along a plane orthogonal to the longitudinal axis L of the flame producing assembly 10. In other words, the level tracking member 24 may be a float that is only constrained by the walls of the sealed body 12. According to this embodiment, a confinement member 40 is not required, because the entire sealed body 12 performs the role of the confinement member 40.

Therefore, the level tracking member 24 (magnet floating mechanism) is configured to provide the buoyancy required by the at least one magnet 26 to float on the pressurized liquid fuel. The density of liquid butane, for example, is approximately 600 kg per cubic metre. To enable the magnet to follow the level of the pressurized liquid fuel, the level tracking member 24 requires a lower effective density than the pressurized liquid fuel.

To provide this buoyancy, the level tracking member 24 may comprise, for example, a plastic hollow airtight assembly that encapsulates or is attached to the at least one magnet 26, and is configured to withstand the pressure of the pressurized liquid fuel and its chemical properties.

According to embodiments, the level tracking member 24 may comprise, for example, a porous material such as an open cell foam, or a closed cell foam, capable of increasing the effective surface area of the at least one magnet 26, enabling it to float on the liquid fuel.

According to embodiments, the level tracking member 24 may comprise an unattached item of low density material (such as a closed cell foam or a float) as the buoyant member, supporting a loose magnet 26. According to embodiments, the level tracking member 24 may comprise a hollow magnet 26 sealably enclosing a void containing a gas, where the gas provides buoyancy to the magnet 26.

According to examples, the at least one magnet 26 may be partially or fully supported by a spring or resilient member (not illustrated) to offset the weight of the magnet. In this case, the required buoyancy, and thus size, of the buoyant member 28 may be reduced.

According to embodiments, the fuel indicator 22 is disposed along a portion of the external surface of the sealed body 12. The fuel indicator 22 may be configured to appear to a user of the flame producing assembly 10 as a graphical indication which can provide an estimate to the user of the number of flames left based on the level of fuel remaining inside the sealed chamber 12. In embodiments, the fuel indicator 22 has a scale (for example, applied to the magnetically active material using a black ink, for example) indicating a plurality of segments, so that each increment indicates an approximate number of flames left. For example, if the fuel indicator 22 has a length of 50 mm, and a fuel-filled flame producing assembly 10 can provide approximately 2000 ignitions, the fuel indicator 22 may indicate a visual change 25 mm along the visible surface of the fuel indicator 22, depicting that the flame producing assembly 10 has approximately 1000 ignitions remaining.

According to embodiments, the fuel indicator 22 is distributed along at least a portion of an outer surface of the flame producing assembly, and a magnetic axis M between north pole and south pole of the at least one magnet 26 is aligned substantially orthogonally to the longitudinal axis, such that a component of magnetic flux intercepted by the fuel indicator is substantially maximised.

Such an arrangement facilitates clearer indication of the amount of remaining fuel on a magnetically active fuel indicator 22, magnetically active fuel indicator 22 is stimulated by stronger magnetic field. This may enable a smaller magnet to be used in the confinement member 40, and thereby reduces the size of buoyant member 28 required. Furthermore, such an arrangement may reduce the magnitude of magnetic fields directed from the at least one magnet 26 towards metallic components typically located at the proximal end 14 of a flame producing assembly 10, such as the wind guard 15 or the ignition control portion 11.

Figure 5:
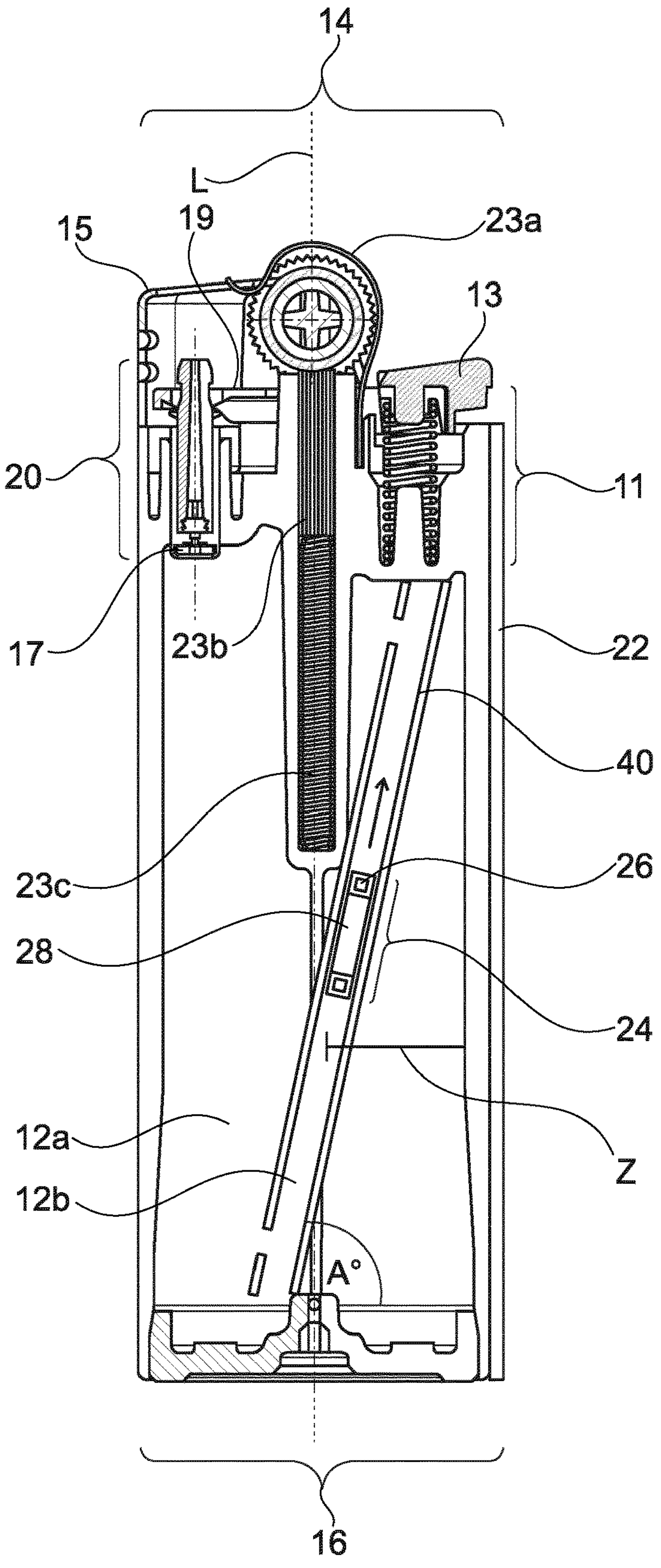
FIG. 5 schematically illustrates a longitudinal section of an alternative flame producing device according to aspects discussed herein.

FIG. 5 schematically illustrates a longitudinal section of an alternative flame producing device according to aspects discussed herein.

According to an embodiment, the internal surface of the second chamber 12*b* is aligned to form an internal angle of A degrees with the longitudinal axis L of the flame producing assembly of between 2° and 40°, and is thus configured to vary a separation distance z between the level tracking member 24 and the fuel indicator 22 as the amount of fuel in the sealed body changes, to provide a corresponding variation of magnetic flux intercepted by the fuel indicator.

The arrangement of FIG. 5 is similar to those discussed above, except for the fact that the second chamber 12*b* (and/or its associated confinement member 40) is now arranged at an offset angle A° from the perpendicular to the longitudinal axis L of the flame producing assembly 10. For example, the offset angle may be 85°, 80°, 75°, 70°, 65°, 60°, or 55°. The second chamber 12*b* comprises at least one liquid flow aperture ensuring that the second chamber 12*b* is in fluidic communication with the first chamber 12*a*.

As the fuel level in the first chamber 12*a* declines, in use, the level tracking member 24 moves down the confinement member 40 and approaches the distal end 16 of the flame producing assembly. Because the confinement member 40 is arranged at a non-zero angle, for each reduction in the level of fuel in the sealed chamber 12, the level tracking member 24 moves laterally away from the fuel indicator 22 by a distance z. Thus, the at least one magnet 26 comprised on the level tracking member 24 may exert a progressively weaker magnetic flux on the fuel indicator 22 as the fuel level reduces. This may be used as part of an optical feedback motif to a user denoting a fading colour or icon that implies a loss of remaining fuel duration, for example.

Figure 6:
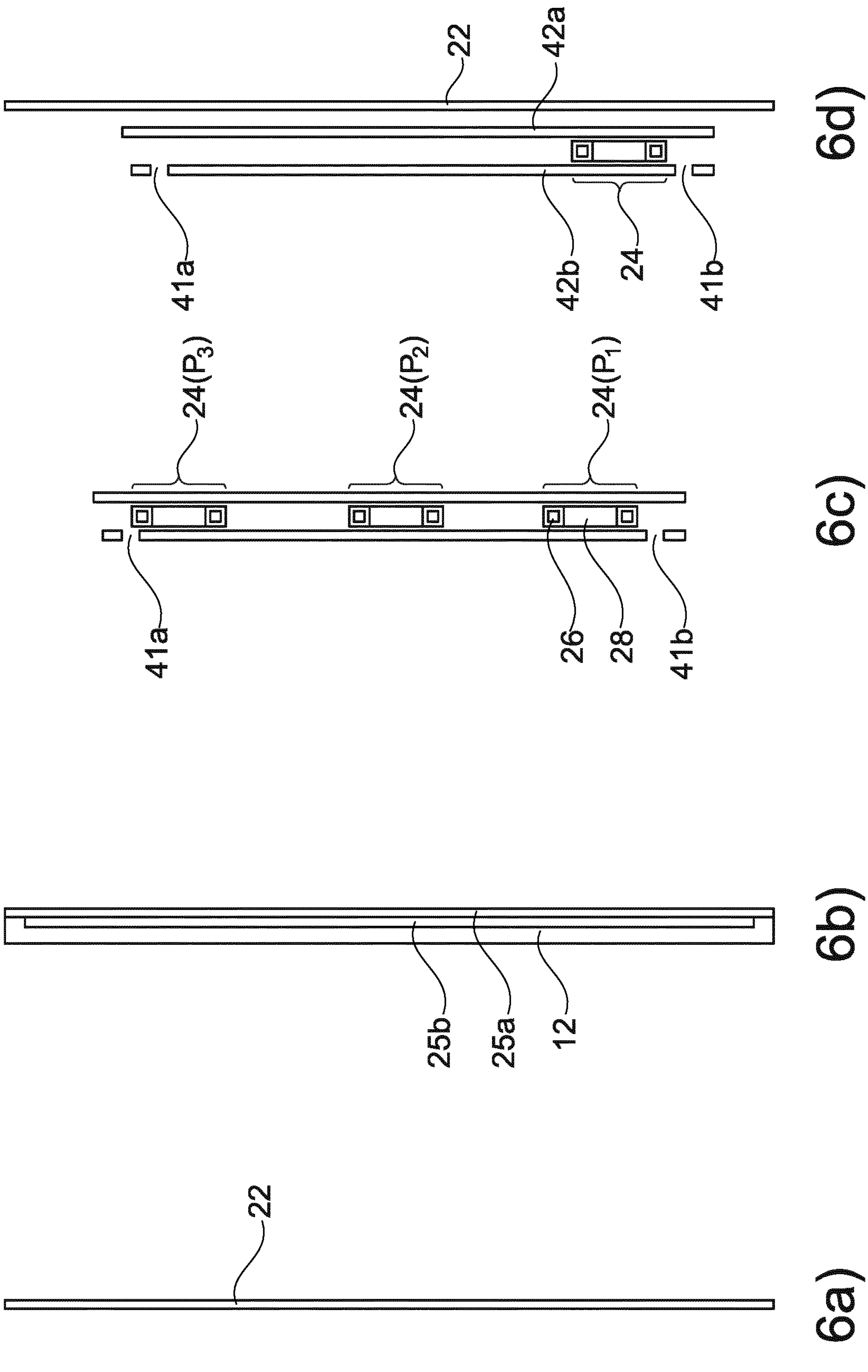
FIG. 6*a*)-6*d*) schematically illustrate aspects of a magnetochromic display according to aspects discussed herein.

FIG. 6*a*)-6*d*) schematically illustrate aspects of a magnetochromic display according to aspects discussed herein.

FIG. 6*a*) illustrates a fuel indicator 22 in the form of a strip of magnetochromic material that can be applied to the external surface of a flame producing assembly. This form of fuel indicator 22 may utilize solid magnetochromic materials such as magnetochromic polymer, or magnetochromic viewing film.

FIG. 6*b*) illustrates a fuel indicator in the form of a cartridge disposed along the portion of the wall of a sealed body 12 of a flame producing assembly. A longitudinal groove or depression formed in the wall of a sealed body 12, for example, may be covered by a translucent or clear member 25*a*. The void formed thereby may be filled with a liquid magnetochromic material and sealed. Therefore, as a magnet moves in proximity to the liquid magnetochromic material, a user may observe a change in appearance through the translucent or clear member 25*a*. The width of the translucent or clear member 25*a*, and/or the longitudinal groove or depression, may vary in the longitudinal direction. For example, the longitudinal groove or depression may have a greater width towards the proximal end 14 of the flame producing assembly, disappearing to a point towards the distal end 16 of the flame producing assembly 10. This is another example of an optical motif that communicates to the user that the fuel comprised in the sealed body is becoming scarce. In an example, the translucent or clear member 25*a* may comprise an optical filter. The optical filter may vary in colour along the longitudinal dimension of the flame producing assembly. In an example, a portion of the translucent or clear member 25*a* may be polarised.

FIG. 6*c*) illustrates the level tracking member 24 at three positions in the second chamber 12*b* (confinement member 40) P1, P2, and P3 according to an amount of fuel remaining.

FIG. 6*d*) illustrates the level tracking member 24 in combination with the fuel indicator 22 in the form of a strip of magnetochromic material. A maximum change in colour of the fuel indicator 22 can be observed by a user at point X.

A magnetochromic material changes its colour under the influence of a magnetic field. This change in colour usually occurs at least in the visible region of the electromagnetic spectrum. One example of a magnetochromic material is a cartridge housing the commercially available NanoBRICK™ MTX ink in a liquid state. NanoBRICK™ MTX ink uses magnetically changeable photonic crystals capable of reflecting different wavelengths of light depending on the intensity of the magnetic field that they are subjected to. When these crystals are suspended in a liquid solution, they can make the ink cartridge capable of changing colour in the presence of a magnetic field.

A magnetic viewing film may, for example, house small metal filings suspended in a coloured liquid (such as a green liquid). In the presence of a magnetic field, the filings align themselves, thus changing the hue of the film. Furthermore, magnetic viewing film comprising magnetochromic polymer microspheres provides a chromatic reaction to the presence of a proximate magnetic field.

According to embodiments, the fuel indicator 22 (for example, a magnetic indication system) comprises a magneto chromatic material, magneto chromatic polymer microspheres, or a magnetically active coating comprising ferroactive particles.

In embodiments, the fuel indicator 22 is responsible for reporting a change in the intensity of the magnetic field that is close to it, via a change in colour in the visible spectrum of the fuel indicator 22. In embodiments, the fuel indicator 22 comprises a strip disposed along a portion of the outer body of the flame producing assembly 10. In embodiments, the strip is disposed along the entire outer body of the flame producing assembly. In embodiments, the fuel indicator 22 is disposed on an outer portion of the sealed body 12 that is proximally in alignment with the predefined path of the level tracking member defined by confinement member 40. In embodiments, the entire outer body of the sealed body 12 comprises a fuel indicator 22. In embodiments, the fuel indicator 22 is a longitudinal strip having width of 2 mm, 3 mm, 4 mm, 5 mm or more.

Figure 7:
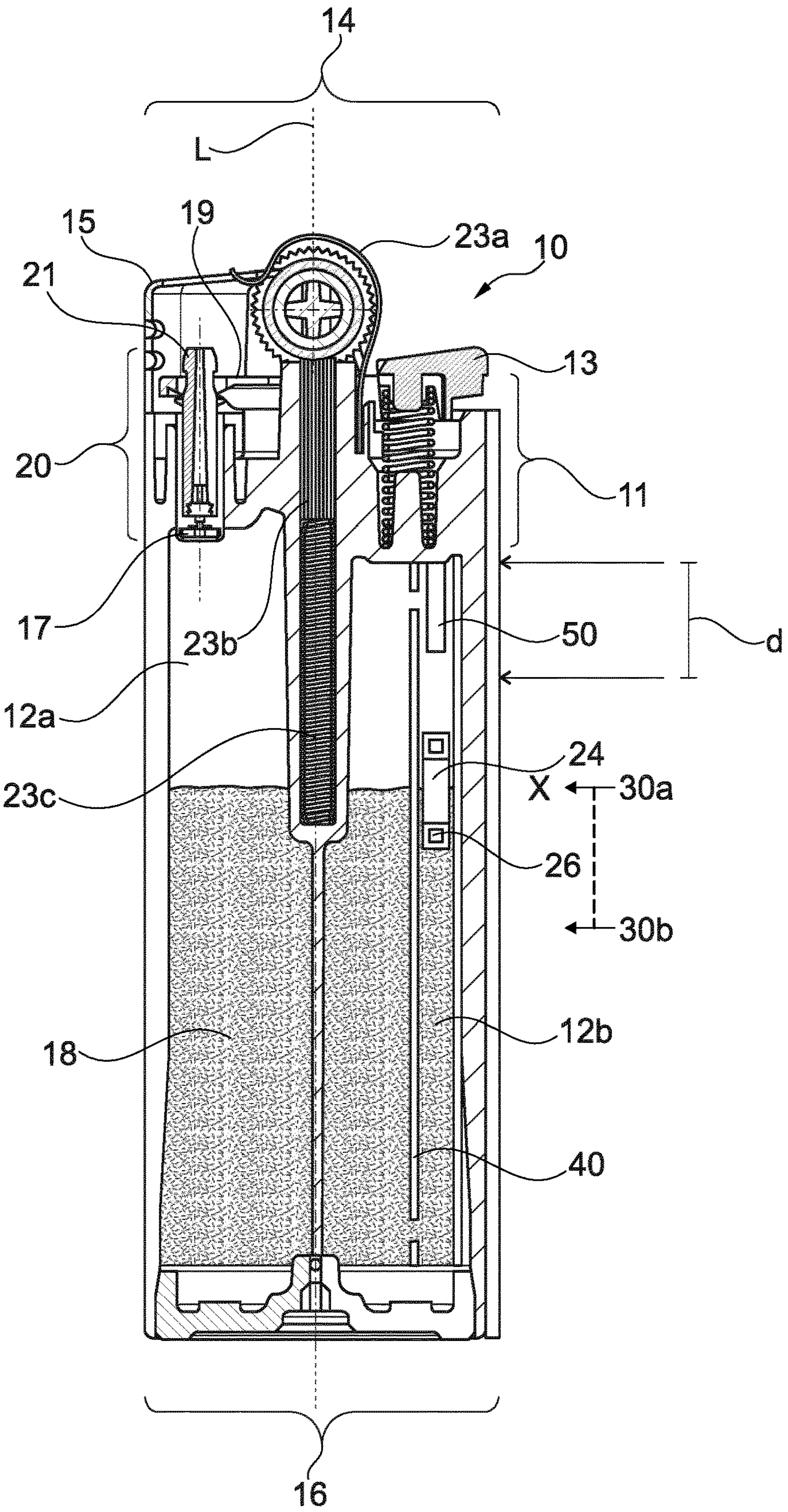
FIG. 7 schematically illustrates a longitudinal section of an alternative flame producing device according to aspects discussed herein.

FIG. 7 schematically illustrates a longitudinal section of an alternative flame producing device according to aspects discussed herein.

According to embodiments, one or more of the level tracking member 24 and/or the proximal 14 or distal 16 end of the sealed body 12 are spaced apart d, for example using a spacing member 50, along a substantially longitudinal axis L of the sealed body. The spacing member is configured to prevent the at least one magnet 26 of the level tracking member 24 becoming permanently affixed at the proximal and/or distal ends of the flame producing assembly by magnetic attraction to a metal member located at either the proximal and/or distal ends of the flame producing assembly 10, respectively.

According to embodiments, the spacing member 50 comprises at least one resilient member, for example a spring or foam block, attached to either the proximal 14 or distal 16 end of the sealed body 12 and configured to support the level tracking member 24.

In a typical flame producing assembly 10 such as a cigarette lighter as shown in FIG. 1, the proximal end 14 of the flame producing assembly 10 may comprise ferromagnetic materials in the wind guard 15, the ignition control portion 11, and/or the fuel release assembly 20, for example.

The dimensions of the spacing member 50 according to an example of the lighter according to the first aspect may be designed to ensure that the magnet 26 of the level tracking member 24 does not become permanently stuck to the proximal end 14 of the flame producing assembly 10 if it becomes upended between uses, for example whilst being kept in a user's pocket. The dimensions of the spacing member 50 are calculated to ensure that for the type of magnet 26 used as part of the level tracking member 24, the attractive force between the magnet 26 and the proximal end of the flame producing assembly 10 are not great enough to cause the level tracking member 24 to become permanently stuck to the proximal end 14 of the flame producing assembly 10 either when supported in liquid fuel, or not.

In embodiments, the spacing member 50 may alternatively, or in addition, be included on a proximally, or distally, oriented portion of the level tracking member 24. This also functions to separate the at least one magnet 26 from the proximal end, for example.

Provision of a spacing member 50 is not essential, because in some configurations, the at least one magnet 26 may have a small enough strength, and/or the amount of ferrous metal in the proximal and/or distal ends of the flame producing assembly may be reduced to the extent that the level tracking member 26 cannot become stuck at either the proximal or distal ends.

According to embodiments, the sealed body 12 comprises a constant circular cross section in a plane orthogonal to the longitudinal axis L. The confinement member 40 is a single or double spiral guide disposed on the internal surface of the sealed body 12. As the amount of fuel in the sealed body 12 changes, the level tracking member 24 is rotationally displaced in the plane orthogonal to the longitudinal axis L as the level tracking member 24 moves in the direction of the longitudinal axis 12, thus enabling the fuel indicator 22 to change according to an angular component around the sealed body 12.

According to embodiments, the inner wall of the second chamber 12*b* and the level tracking member 24 both have complementary non-circular cross sections in a plane orthogonal to the longitudinal axis L, thus preventing rotational movement of the level tracking member 24 in a plane orthogonal to the longitudinal axis L.

Figure 8:
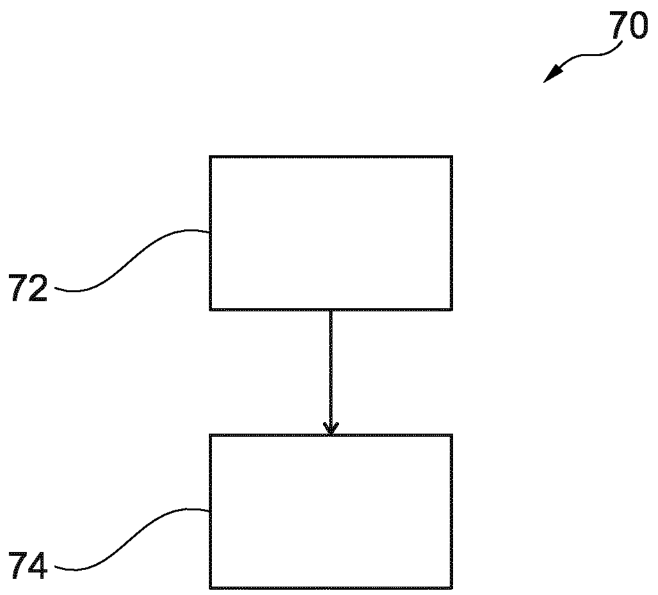
FIG. 8 schematically illustrates a method of using a flame producing assembly according to aspects discussed herein.

FIG. 8 schematically illustrates a method 70 of using a flame producing assembly according to aspects discussed herein.

According to a second aspect, there is provided a method 70 for using a flame producing assembly, comprising:

aligning 72 a flame producing assembly comprising a sealed body having a proximal and a distal end aligned on a longitudinal axis such that the longitudinal axis of the sealed body is substantially vertical, and such that a fuel indicator of the flame producing assembly is configured to indicate a remaining amount of liquid fuel contained in the sealed body to a user of the flame producing assembly, wherein at least a portion of the fuel indicator is capable of changing appearance when in proximity to a magnetic field, wherein the sealed body contains a liquid fuel supply; and monitoring 74 a level tracking member of the flame producing assembly comprising at least one magnet supported by a buoyant member and configured to apply a magnetic field to the fuel indicator, thereby causing the fuel indicator to indicate an amount of liquid fuel remaining in the sealed body to a user, thus causing the fuel indicator to change appearance such that the remaining level of liquid fuel is reported to the user.

For example, in use, a user sets the flame producing assembly 10 on a substantially flat surface, or aligns it such that its centre perpendicular (longitudinal) axis L is in substantially the same direction as vertical. The level tracking member 24 moves and comes to rest at the same level as the remaining fuel supply 18. The magnitude of the magnetic field strength close to the magnet 26 is greatest, thus causing a change of colour of a magnetically active indicator pigment or fluid adjacent to the magnet in, or on, the fuel indicator.

The user is able to read the change of colour corresponding to the amount of liquid fuel remaining. For example, the fuel indicator may change to a darker green colour, or the magnetochromic material changes colour. For example, NanoBRICK™ ink may change from a brown to a blue hue. In examples, a legend or scale adjacent to the fuel indicator may provide numerical feedback concerning the amount of remaining fuel.

In the preceding specification, numerous specific details are set forth in order to provide a thorough understanding. It will be apparent, however, to one having ordinary skill in the art that the specific detail need not be employed to practice the present disclosure. In other instances, well-known materials or methods have not been described in detail in order to avoid obscuring the present disclosure.

Reference throughout the preceding specification to "one embodiment", "an embodiment", "one example" or "an example", "one aspect" or "an aspect" means that a particular feature, structure, or characteristic described in connection with the embodiment or example is included in at least one embodiment of the present disclosure. Thus, appearances of the phrases "in one embodiment", "in an embodiment", "one example" or "an example", "one aspect" or "an aspect" in various places throughout this specification are not necessarily all referring to the same embodiment or example.

Furthermore, the particular features, structures, or characteristics may be combined in any suitable combinations and/or sub-combinations in one or more embodiments or examples.

The invention claimed is:

1. A flame producing assembly, comprising:
a sealed body comprising a proximal end and a distal end aligned on a longitudinal axis, wherein the sealed body comprises a void and a visible portion;
a fuel supply comprising liquid fuel accommodated in the void within the sealed body;
a fuel release assembly enabling a controllable release of the fuel supply in gaseous form from the sealed body;
a fuel indicator configured to indicate a remaining amount of fuel supply contained in the sealed body to a user of the flame producing assembly, wherein at least a portion of the fuel indicator is capable of changing appearance of the visible portion of the sealed body when in proximity to a magnetic field, and wherein the fuel indicator comprises a magneto chromatic material, magneto chromatic polymer microspheres, or a magnetically active coating comprising ferro-active particles; and
a level tracking member comprising at least one magnet supported by a buoyant member;
wherein the at least one magnet is configured to apply a magnetic field to the fuel indicator, thereby causing the fuel indicator to indicate the remaining amount of fuel supply in the sealed body to the user.

2. The flame producing assembly according to claim 1, wherein the buoyant member is configured to translate the at least one magnet from a first position to a second position relative to the longitudinal axis as the remaining amount of the liquid fuel in the sealed body decreases.

3. The flame producing assembly according to claim 1, wherein the fuel indicator is distributed along at least a portion of an outer surface of the sealed body of the flame producing assembly; and/or
wherein a magnetic axis between north pole and south pole of the at least one magnet is aligned substantially orthogonally to the longitudinal axis, such that a component of magnetic flux intercepted by the fuel indicator is substantially maximized.

4. The flame producing assembly according to claim 1, wherein the buoyant member is a buoyant capsule or a porous raft configured to support the at least one magnet.

5. The flame producing assembly according to claim 1, wherein an interior of the sealed body comprises at least one confinement member to confine a path of the level tracking member within the sealed body.

6. The flame producing assembly according to claim 1, wherein the void within the sealed body is divided such that the sealed body comprises a first chamber and a second chamber, wherein the second chamber is aligned in parallel with the longitudinal axis, wherein the second chamber is in fluidic communication with the first chamber, and wherein the level tracking member is confined to the second chamber and a boundary of the second chamber is proximate to the fuel indicator.

7. The flame producing assembly according to claim 6, wherein an internal surface of the second chamber comprises a coating configured to facilitate movement of the level tracking member in a direction substantially parallel to the longitudinal axis.

8. The flame producing assembly according to claim 6, wherein an internal surface of the second chamber is aligned to form an internal angle with the longitudinal axis of between 2 and 40 degrees, and is configured to vary a separation distance between the level tracking member and the fuel indicator as the remaining amount of fuel supply in the sealed body changes to provide a corresponding variation of magnetic flux intercepted by the fuel indicator.

9. The flame producing assembly according to claim 1, wherein the level tracking member and the proximal end of the sealed body or the distal end of the sealed body are spaced apart along the longitudinal axis of the sealed body via a spacing member, wherein the spacing member is configured to prevent the at least one magnet from becoming permanently affixed at a proximal end of the flame producing assembly or the distal end of the flame producing assembly by magnetic attraction to a metal member located at either the proximal end of the flame producing assembly or the distal end of the flame producing assembly, respectively.

10. The flame producing assembly according to claim 1, wherein the fuel indicator is configured to display feedback to the user of the remaining amount of fuel supply in the sealed body via one or more text or indicator labels on the visible portion of the flame producing assembly, and/or via a change in color of the fuel indicator.

11. The flame producing assembly according to claim 1, wherein the fuel indicator indicates the remaining amount of fuel supply relative to the proximal end of the sealed body and the distal end of the sealed body to a user.

12. The flame producing assembly according to claim 1, wherein the fuel indicator comprises a further sealed body or channel comprising a liquid magnetochromic ink.

13. The flame producing assembly according to claim 1, wherein the liquid fuel is methane, acetylene, propane, propylene, hydrogen, or isobutane, or combinations thereof.

14. A flame producing assembly, comprising:
a sealed body comprising a proximal end and a distal end aligned on a longitudinal axis, wherein the sealed body comprises a void and a visible portion;
a fuel supply comprising liquid fuel accommodated in the void within the sealed body;
a fuel release assembly enabling a controllable release of the fuel supply in gaseous form from the sealed body;
a fuel indicator configured to indicate a remaining amount of fuel supply contained in the sealed body to a user of the flame producing assembly, wherein at least a portion of the fuel indicator is capable of changing appearance of the visible portion of the sealed body when in proximity to a magnetic field, and wherein the fuel indicator comprises a further sealed body or channel comprising a liquid magnetochromic ink; and a level tracking member comprising at least one magnet supported by a buoyant member;

wherein the at least one magnet is configured to apply a magnetic field to the fuel indicator, thereby causing the fuel indicator to indicate the remaining amount of fuel supply in the sealed body to the user.

15. The flame producing assembly according to claim 14, wherein the buoyant member is a buoyant capsule or a porous raft configured to support the at least one magnet.

16. The flame producing assembly according to claim 14, wherein the fuel indicator is configured to display feedback to the user of the remaining amount of fuel supply in the sealed body via one or more text or indicator labels on the visible portion of the flame producing assembly, and/or via a change in color of the fuel indicator.

17. The flame producing assembly according to claim 14, wherein the fuel indicator indicates the remaining amount of fuel supply relative to the proximal end of the sealed body and the distal end of the sealed body to a user.

18. A flame producing assembly, comprising:

a sealed body, wherein the sealed body comprises a void and a visible portion;

a fuel supply comprising liquid fuel accommodated in the void within the sealed body;

a fuel release assembly enabling a controllable release of the fuel supply in gaseous form from the sealed body;

a fuel indicator configured to indicate a remaining amount of fuel supply contained in the sealed body to a user of the flame producing assembly, wherein at least a portion of the fuel indicator is capable of changing appearance of the visible portion of the sealed body when in proximity to a magnetic field; and a level tracking member comprising at least one magnet supported by a buoyant member;

wherein the at least one magnet is configured to apply a magnetic field to the fuel indicator, thereby causing the fuel indicator to indicate the remaining amount of fuel supply in the sealed body to the user; and wherein the void within the sealed body is divided such that the sealed body comprises a first chamber and a second chamber, wherein the second chamber is aligned in parallel with a longitudinal axis, wherein the second chamber is in fluidic communication with the first chamber, and wherein the level tracking member is confined to the second chamber and a boundary of the second chamber is proximate to the fuel indicator.

19. The flame producing assembly according to claim 18, wherein an internal surface of the second chamber comprises a coating configured to facilitate movement of the level tracking member.

20. The flame producing assembly according to claim 18, wherein an internal surface of the second chamber is aligned to form an internal angle with the longitudinal axis of between 2 and 40 degrees, and is configured to vary a separation distance between the level tracking member and the fuel indicator as the remaining amount of fuel supply in the sealed body changes to provide a corresponding variation of magnetic flux intercepted by the fuel indicator.

* * * * *